No. 752,182. PATENTED FEB. 16, 1904.
N. G., T. D. & J. M. ROSS.
THRESHING MACHINE.
APPLICATION FILED JUNE 3, 1901.
NO MODEL. 4 SHEETS—SHEET 1.
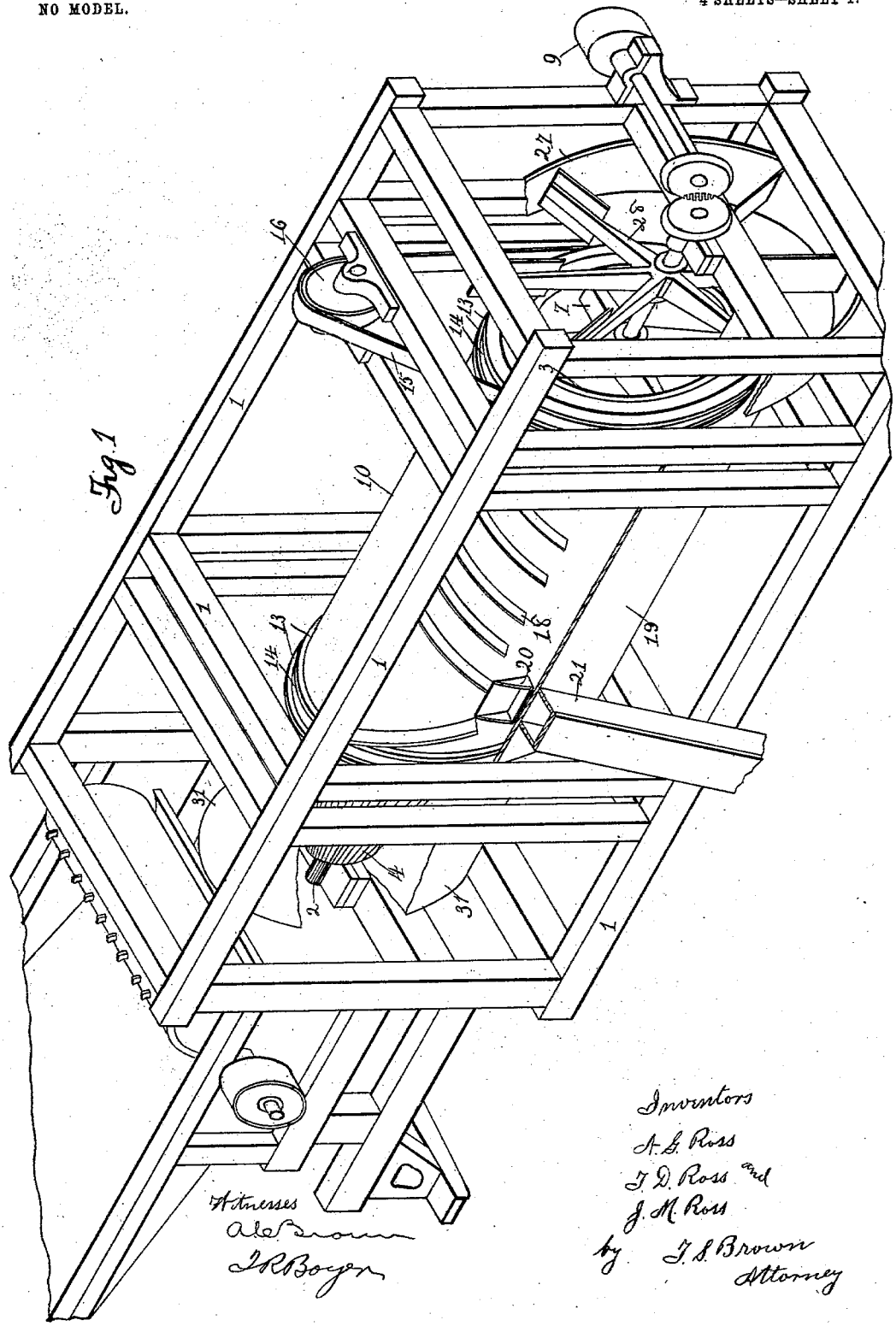

No. 752,182. PATENTED FEB. 16, 1904.
N. G., T. D. & J. M. ROSS.
THRESHING MACHINE.
APPLICATION FILED JUNE 3, 1901.
NO MODEL. 4 SHEETS—SHEET 2.
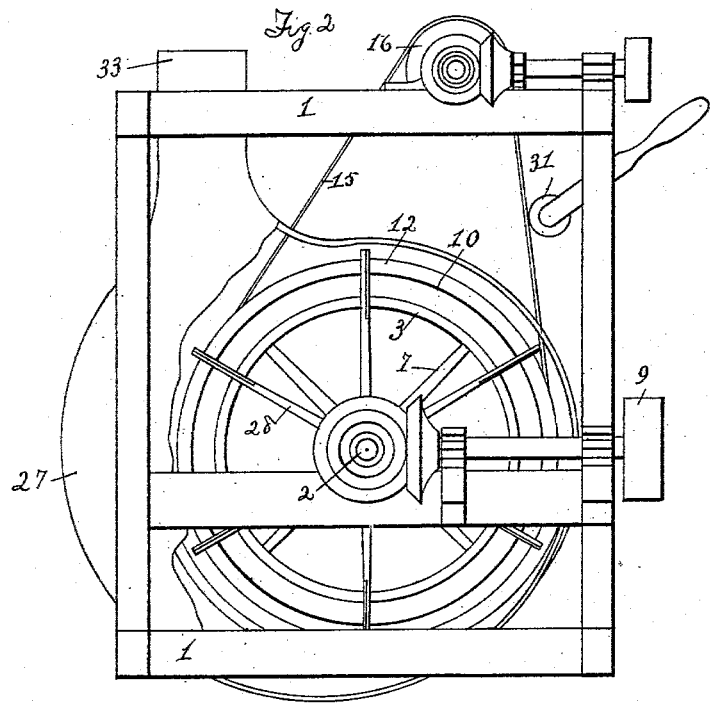
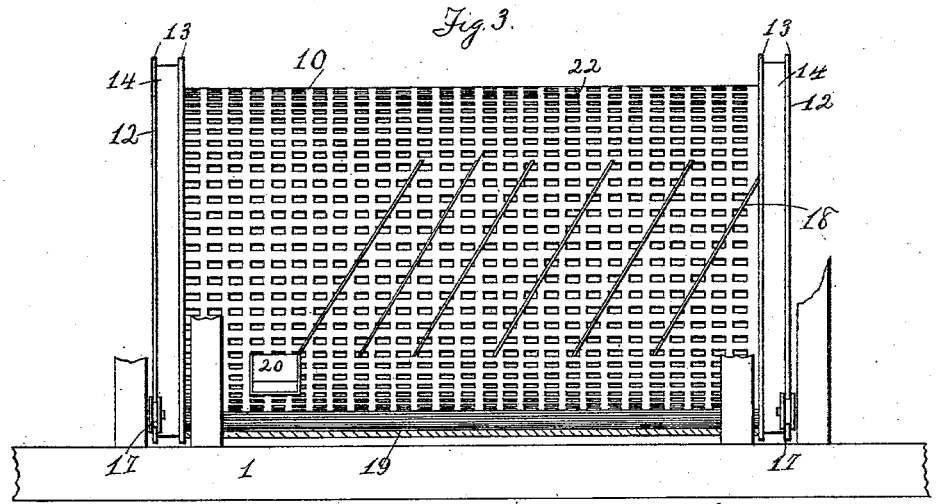

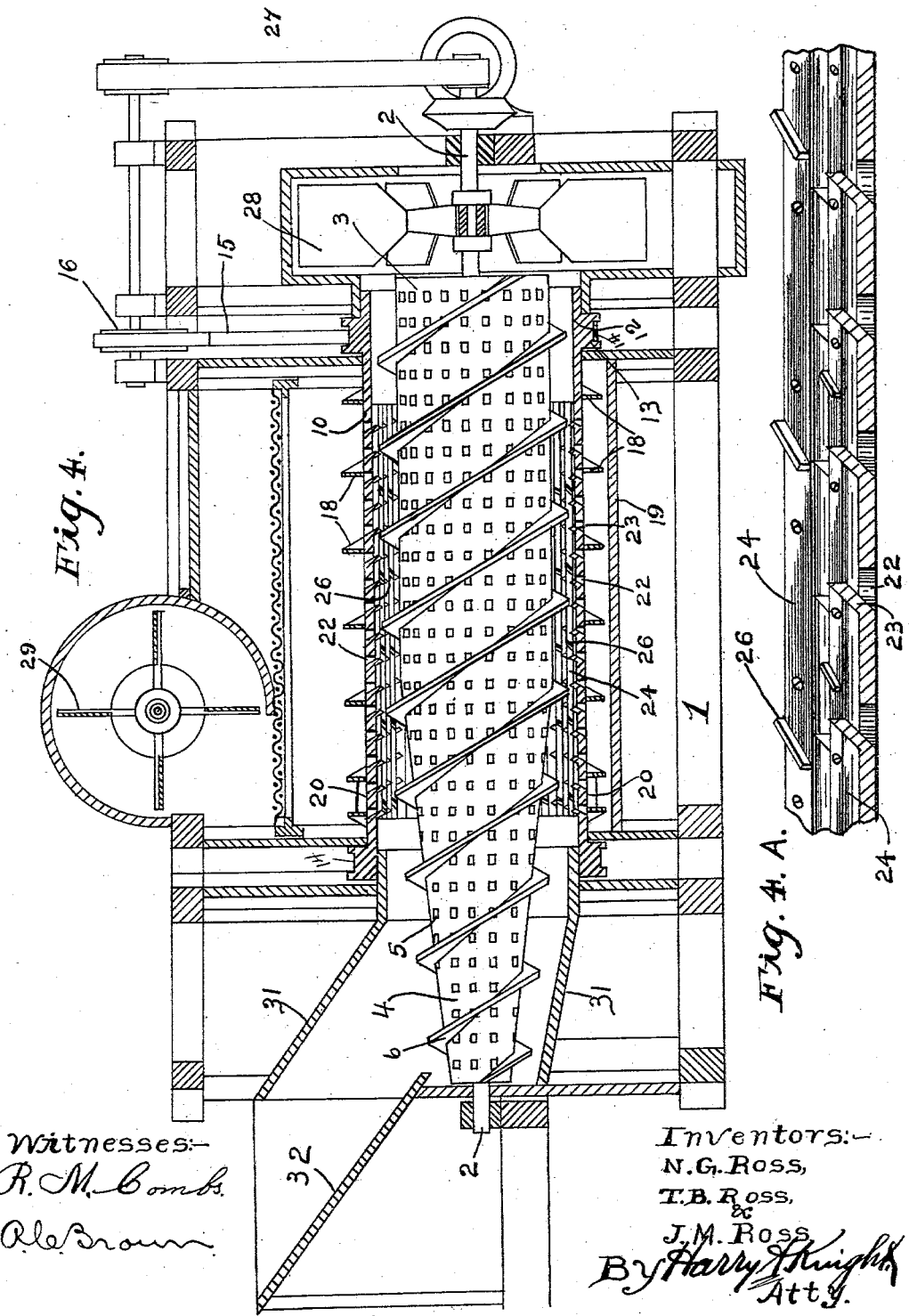

No. 752,182. PATENTED FEB. 16, 1904.
N. G., T. D. & J. M. ROSS.
THRESHING MACHINE.
APPLICATION FILED JUNE 3, 1901.
NO MODEL. 4 SHEETS—SHEET 4.
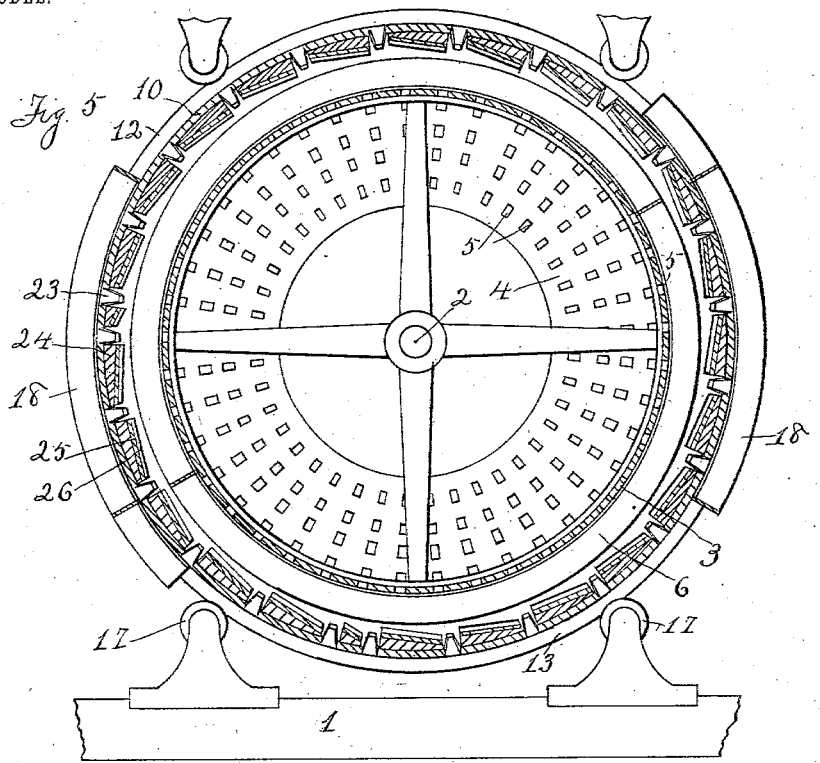
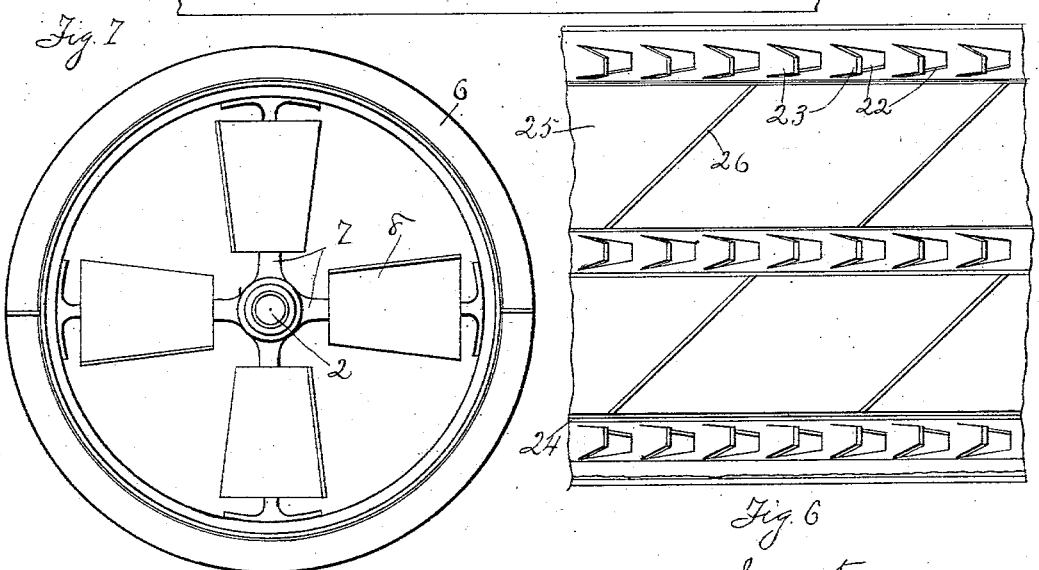
Witnesses
Inventors
N. G. Ross
T. D. Ross and
J. M. Ross,
by T. S. Brown
Attorney No. 752,182. Patented February 16, 1904.

UNITED STATES PATENT OFFICE.

NOBLE G. ROSS, OF KANSAS CITY, MISSOURI, AND THOMAS D. ROSS AND JOSEPH M. ROSS, OF KANSAS CITY, KANSAS.

THRESHING-MACHINE.

SPECIFICATION forming part of Letters Patent No. 752,182, dated February 16, 1904.

Application filed June 3, 1901. Serial No. 62,992. (No model.)

*To all whom it may concern:*

Be it known that we, NOBLE G. ROSS, of Kansas City, in the county of Jackson, in the State of Missouri, and THOMAS D. ROSS and JOSEPH M. ROSS, of Kansas City, in the county of Wyandotte, in the State of Kansas, citizens of the United States, have invented a certain new and useful Threshing-Machine, of which the following is a full, clear, and exact description, reference being had to the accompanying drawings, which form a part of this specification.

Our invention relates to a new and useful threshing-machine for threshing wheat, oats, and other cereals; and our invention consists in certain features of novelty hereinafter described, and pointed in the claims.

Figure 1 represents an isometric view of a threshing-machine embodying our invention, a part of the casing being removed to show the relation of the cylinders to the framework. Fig. 2 represents an elevation of the rear end of the machine with the casing of the fan-chamber partly broken away and the fan-wings removed from the cylinder-spokes. Fig. 3 represents a detail side elevation of the external separating or winnowing cylinder. Fig. 4 represents a longitudinal sectional view of the machine, showing a hopper or chute for delivering the grain to the cylinder, the usual spiked threshing-cylinder, as shown in Fig. 1, being omitted. Fig. 4ª is an enlarged detail view, partly in section, showing the longitudinal winnowing-strips wedge-shaped in cross-section and the upright flanges thereon and the lips punched out from the shell of the winnowing-cylinder. Fig. 5 represents a detail cross-section of the two cylinders with the fan-wings removed from the cylinder-spokes. Fig. 6 represents a plan view of Fig. 4ª. Fig. 7 represents a rear end view of the inner or threshing cylinder, showing the fan-wings on the cylinder-spokes.

Similar numerals refer to similar parts throughout the several views.

1 represents the frame of the machine. Extending longitudinally through the frame and journaled in suitable bearings mounted upon the end cross-ties of the frame is a shaft 2, which forms the axis of the inner or threshing cylinder 3. Said cylinder for a distance at its forward end is tapered or cone-shaped, as shown at 4, and throughout its length the shell of said cylinder and cone are perforated, as shown at 5 in Fig. 4. Spirally-arranged beater-blades 6 are mounted upon said cylinder and cone. At its rear end the cylinder spokes or arms 7 of the hub by which said cylinder is mounted upon the shaft are provided with fan-wings 8, which may be arranged parallel with the plane of the shaft, as shown in Fig. 4, or at an angle thereto, as shown in Fig. 7, or may be dispensed with entirely. Said cylinder, as shown, is preferably driven by gearing operated through a band-wheel 9, connected with a source of power, or, as is manifest, it may be driven by any suitable connection with a source of power. Exterior to and concentric with said threshing-cylinder is a winnowing or separating cylinder 10. Said cylinder is provided at its ends with collars 12, having flanges 13, which form channels 14, in one of which may be mounted a driving-belt 15, said belt passing around a driving-pulley 16, mounted upon the frame, operating to rotate said cylinder. Said driving-pulley, as shown in Fig. 2, may be driven by gearing operated through a pulley connected with a suitable source of power, or, as shown in Fig. 4, it may be driven by a pulley belted to a pulley upon the shaft 2. Said cylinder is supported and rotates upon grooved wheels 17, mounted upon the cross-sills of the frame, one of the flanges 13 at each end of the cylinder traveling in the groove of the supporting-wheels to retain said cylinder in proper operative relation to the other parts. Upon the exterior of said cylinder are provided conveyers 18, arranged to operate in a trough 19, surrounding the lower part of said cylinder, and convey the grain toward the forward end of said trough, where it is taken up by buckets 20, carried upon said cylinder, and discharged into a spout 21, from which it can be taken care of in the usual manner. The shell of said separating-cylinder is perforated in rows throughout, as shown at 22, said perforations being of such size as to permit freely the passage of the grain any size through the same into the trough and, as shown in Figs. 4, 4ª, and 5, are preferably formed by cutting the lips 23 from the material of the shell and bending said lips 23 inward upon the uncut side, the arrangement being such that said lips will stand at an inclination forward of the openings and prevent the straw and chaff in passage from passing into and through said openings, and thereby clogging the machine. Between the rows of said perforations and lips are secured longitudinally winnowing-strips, wedge-shaped in cross-section, as shown in Fig. 5, providing an inclined inner face and arranged to prevent the grain being carried over by the rotating cylinder and direct its travel to and through the perforations. The winnowing-strips may be faced with wearing-plates, as shown in Fig. 4ª, and are provided with flanges 26, arranged to intercept the passage of the grain toward either end of the cylinder and lead it to the openings through which it passes to the trough, the centrifugal force of the rotating cylinder acting, as will be understood, to carry the grain to the periphery and through said openings. Immediately to the rear of said cylinders a fan-chest 27 is mounted upon the frame, and in said chest a centrifugal fan 28, mounted upon a shaft 2, is operated, the construction and operation being such that it may be connected up to a pneumatic stacker, as it is manifest that the piping of such stacker may be connected with the upper part of said fan-chest, which being familiar construction is not shown. A fan 29 of usual construction is mounted upon the frame over the forward end of the outer cylinder, and a screen 30 is interposed in the space in the frame above said cylinder. The fan 29 may be dispensed with, if desired. The forward end of the inner cylinder is inclosed by a casing 31, with which, as shown in Fig. 4, communicates a chute or hopper 32, or, as is shown in Fig. 1, a spiked cylinder and concave of usual construction may be mounted in advance of said inner cylinder and casing and the usual feed-table provided and the grain first passed through and delivered therefrom to the longitudinal threshing-cylinder. Under some conditions, as when the straw is very heavy or not thoroughly dry, such cylinder and concave may be necessary; but under ordinary conditions, and particularly when the grain has been harvested with a header, as is most usually done in many parts of the country, the construction shown in Fig. 4 is sufficient and preferable. The inner cylinder is rotated at a very high speed, and the outer cylinder is rotated in the same direction at a very low speed.

In operation the grain is thrown into the hopper or fed through the cylinder and concave and thence delivered upon the cone of the inner or threshing cylinder. Thence by the action of the spiral beater-blades on the cone and the suction generated by the fans it is carried back between the inner and outer cylinders, where by the centrifugal force of the inner cylinder it is held against the face of the outer cylinder and by the action of the spiral beater-blades upon said inner cylinder the grain is threshed out of the ears or heads, and the straw and chaff, by the spiral arrangement of the beaters and the difference in rotation of the cylinders, the outside cylinder holding the straw subject to the action of the spiral beater-blades and the suction generated by the fan, are carried back to the fan-chest and blown out through the exit 33 thereof either to a pneumatic stacker or suitable receptacle, while the grain passes through the perforations 22 in the outer cylinder into the trough and is carried forward therein by the conveyers 18 to be taken up by the buckets 20 and discharged into the spout 21. The fan 29 when used acts to help keep the perforations in the outer cylinder clear from straw and chaff by maintaining a suction through the perforations from outside to inside of the cylinder from above.

The operation of the machine is very effective, practically no grain whatever passing over with the straw and chaff, or if it should be found that any is passing over such difficulty may be remedied by increasing the speed of the outer cylinder by proper adjustment of the belt-tightener 31, (shown in Fig. 2,) while by the screening action of the outer cylinder and the suction of the fan the straw and chaff and substantially all extraneous seeds and other matter are removed and the grain discharged in clean condition.

The machine is very simple in construction and operation, comprising very few parts, is light-running, and having few bearings is comparatively free from friction, and in weight when mounted upon a truck is less than half that of the ordinary threshing-machine.

The shaft of the inner cylinder extending longitudinally and having its bearings at the opposite ends of the frame and the supports of the outer cylinder being in line therewith and near the ends of the frame the concentric operative relation of the cylinders is constantly maintained and the operation of the machine is not affected by the position or tilt of the frame, so that the machine does not have to be set up and leveled up before starting, but is ready to run and will operate with full effect wherever it may stand, it making no difference in its operation whether the rear end be up the hill or down the hill or the machine stands across the slant of a hill or on level ground.

Having thus fully described our machine, what we claim as our invention, and desire to secure by Letters Patent, is—

1. In a threshing-machine, the combination with a trough, of a perforated cylinder rotating in said trough and adapted to deliver grain to said trough, of buckets carried by said cylinder for removing grain from said trough, of spirally-arranged blades carried by said cylinder for conveying grain through said trough to said buckets, means delivering wheat to the interior of said cylinder, means within said cylinder for threshing said wheat, and means creating a current of air through said cylinder to remove the straw and chaff.

2. In a threshing-machine having a suitable frame and casing, the combination with a cylinder rotatably mounted upon said frame, and having rows of peripheral discharge-openings, longitudinal flanged winnowing-strips mounted on the inner face of said cylinder between and adjacent to said rows of openings, exterior buckets mounted upon said cylinder, exterior spiral blades on said cylinder adapted to lead grain to said buckets, means for threshing wheat within said cylinder, and means rotating said cylinder.

3. In a threshing-machine, the combination with a perforated cylinder having flanged winnowing-strips wedge-shaped in cross-section on its inner face, and means delivering threshed wheat onto said strips.

4. In a threshing-machine, the combination with a perforated cylinder having flanged winnowing-strips adjacent said perforations, a trough to catch grain from said cylinder, and means within said cylinder adapted to thresh wheat.

5. In a threshing-machine, a cylinder having on its inner face flanged winnowing-strips wedge-shaped in cross-section, in combination with an inner concentric cylinder coöperating with said strips to thresh wheat between the two cylinders.

6. In a threshing-machine, a winnowing-cylinder rotatably mounted upon a suitable frame and having rows of peripheral perforations or discharge-openings, lips on the inner side of said cylinder adjacent to the forward edge of said openings for preventing the passage of straw and chaff therethrough, longitudinal flanged winnowing-strips mounted on the inner face of said cylinder in the spaces between said openings, buckets upon the exterior of said cylinder, spiral blades also upon the exterior of said cylinder and leading to said buckets, in combination with means for threshing wheat within the cylinder, and means rotating the cylinder.

7. In a threshing-machine the combination with a trough, of an exterior perforated cylinder rotating in said trough and adapted to deliver grain thereto, of buckets carried exteriorly by said cylinder and adapted to remove grain from said trough, of spirally-arranged blades also carried exteriorly by said cylinder and adapted to deliver grain to said buckets, of an interior concentric cylinder, spiral blades on the exterior of said interior cylinder, means rotating said interior cylinder at a higher rate of speed than said exterior cylinder, means depositing wheat onto said interior cylinder, and fans creating a current of air through the exterior cylinder to carry off the straw and chaff.

8. In a threshing-machine having a suitable frame and casing, a perforated cylinder rotatably mounted in said casing, a cone-shaped forward end on said cylinder, external spirally-arranged blades upon said cylinder and its cone-shaped forward end, and a centrifugal fan mounted immediately at the discharge end of said cylinder and arranged to generate a suction through said cylinder and its cone-shaped forward end.

9. In a threshing-machine having a suitable frame and casing, concentric perforated cylinders rotatably mounted in said casing, a cone-shaped perforated forward end on the inner of said cylinders, external spirally-arranged beater-blades upon said inner cylinder and its cone-shaped forward end, a centrifugal fan mounted immediately at the discharge end of said cylinders to generate a suction through said cylinders, and means rotating said cylinders independently and in the same direction.

10. A threshing-machine comprising a suitable frame and casing, concentric cylinders rotatably mounted upon said frame, and between which the wheat is threshed, means for independently rotating said cylinders, means for discharging the grain therefrom, and a centrifugal fan mounted upon said frame and arranged to create a suction through said cylinders to draw the straw and chaff into the fan-chest of said fan.

11. A threshing-machine of the character described having a suitable frame and casing, concentric perforated cylinders rotatably mounted upon said frame, a cone-shaped perforated forward end on the inner of said cylinders, and external spirally-arranged beater-blades mounted upon the inner of said cylinders for threshing the wheat.

12. In a threshing-machine of the character described, having a suitable frame and casing, concentric cylinders rotatably mounted longitudinally upon said frame, external spirally-arranged beater-blades mounted upon the inner of said cylinders, means for rotating said cylinders at different speed, and means for delivering the wheat to be threshed between said cylinders.

13. In a threshing-machine the combination with a separating-cylinder, means for rotating said cylinder, of an interior concentric threshing-cylinder, means rotating said threshing-cylinder at a greater rate of speed than said separating-cylinder, means removing the straw and chaff from between said cylinders, and means for catching the grain from said separating-cylinder.

14. In a threshing-machine, the combination with a perforated separating-cylinder, means rotating said cylinder, of a perforated threshing-cylinder within said separating-cylinder, means rotating said threshing-cylinder, a fan immediately at the discharge end of the cylinders to create a suction therethrough, and a fan mounted upon the casing over the cylinders for the purpose described.

15. In a threshing-machine, the combination with a rotating separating-cylinder, of a fan suitably mounted above said cylinder and adapted to deliver an air-current thereon, and a screen located between the fan and cylinder.

16. A threshing-machine of the character described comprising an inner and an outer perforated cylinder rotatably mounted in a suitable casing, said inner cylinder having a cone-shaped perforated forward end and provided with external spirally-arranged beater-blades, a centrifugal fan mounted immediately at the discharge end of said cylinders and a fan mounted upon the casing over said cylinders, substantially as set forth.

17. In a threshing-machine of the character described comprising an inner and an outer perforated cylinder rotatably mounted in a suitable casing and a centrifugal fan located immediately at the discharge end of said cylinders; a cone-shaped perforated forward end on said inner cylinder, and external spirally-arranged beater-blades mounted upon said inner cylinder and its cone-shaped end; substantially as set forth.

18. In a threshing-machine of the character described comprising concentric cylinders rotatably mounted in a suitable casing and between which the grain is threshed, the outer of said cylinders having peripheral discharge-openings; internal rearwardly-inclined lips mounted forward of and extending over said openings to prevent the straw and chaff entering and clogging said openings; substantially as set forth.

19. In a threshing-machine of the character described comprising concentric cylinders rotatably mounted in a suitable casing, and between which the grain is threshed, the outer of said cylinders having peripheral discharge-openings; internal longitudinally-extending strips mounted between said openings; to prevent the grain being carried over by the centrifugal action due to the rotation of said cylinder; substantially as set forth.

NOBLE G. ROSS.
THOMAS D. ROSS.
JOSEPH M. ROSS.

Witnesses:
O. J. ARIGHI,
DAVID DOUGLASS.